United States Patent
Chang

[11] 3,883,534
[45] May 13, 1975

[54] ANTHRAQUINONE DYES
[75] Inventor: Charles H. Chang, Piscataway, N.J.
[73] Assignee: GAF Corporation, New York, N.Y.
[22] Filed: Dec. 6, 1972
[21] Appl. No.: 312,476

[52] U.S. Cl............. 260/281; 260/40 R; 260/37 R; 260/326 D; 260/326.5 C
[51] Int. Cl............................................ C07d 27/52
[58] Field of Search.......... 260/326 D, 326.5 C, 281

[56] References Cited
UNITED STATES PATENTS
3,279,880  10/1966  Straley et al. ............... 260/326.5 C
3,446,817  5/1969   Harvey et al. ..................... 260/326

Primary Examiner—Joseph A. Narcavage
Attorney, Agent, or Firm—Walter C. Kehm; James N. Blauvelt

[57] ABSTRACT

Anthraquinone derivatives of the formula

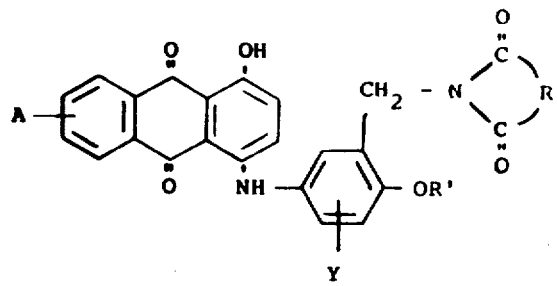

in which A is hydrogen, chlorine, bromine or lower alkyl; R is alkylene of from 2 to 4 carbon atoms, vinylene, 1,2-benzene, 1,2-cyclohexane, 1,8-naphthalene, or 1,2-cyclohex-4-ene; R' is lower alkyl; and Y is hydrogen, hydroxy, chlorine, bromine, lower alkyl or lower alkoxy, are useful for dyeing synthetic, especially polyester, fibers.

7 Claims, No Drawings

ANTHRAQUINONE DYES

This invention relates to new anthraquinone dyestuffs, to a process for their preparation and to their use as dyestuffs for various synthetic fibers. More particularly, it relates to a new class of anthraquinone derivatives which have shown excellent fastness properties when applied to synthetic fibers, especially polyester fibers.

Anthraquinone compounds have long been known to be useful as dyestuffs and, in recent years, many of these compounds have found utility as dyes for synthetic fibers. See for example French Pat. No. 2,002,124 and U.S. Pat. No. 2,533,178. Although anthraquinone dyestuffs generally have desirable dyeing properties, including good light and washing fastness properties, the requirements of modern day dyestuffs, due to more severe textile processing conditions encountered in imparting durable press properties to textiles, result in much higher standards relative to heat and sublimation fastness and the like than were previously necessary.

Excellent dyeing properties have been discovered in new compounds of the formula (I):

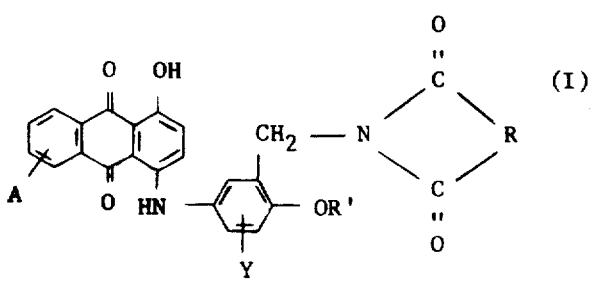

in which A represents hydrogen, chlorine, bromine or lower alkyl; R represents alkylene of from 2 to 4 carbon atoms, vinylene, 1,2-benzene, 1,2-cyclohexane, 1,8-napthalene or 1,2-cyclohex-4-ene, all of which may be substituted by chlorine, bromine or lower alkyl; R' is lower alkyl; and Y represents hydrogen, hydroxy, chlorine, bromine, lower alkyl or lower alkoxy. These compounds have substantially better sublimation fastness than the known, related compounds disclosed in French Pat. No. 2,002,124.

As used in the above formula and elsewhere herein, the term "lower alkyl" means straight or branched chain alkyl groups having from 1 to 4 carbon atoms.

Compounds of formula I are preferably prepared by reacting a 1-hydroxy-4-(4'-alkoxyanilino)-anthraquinone derivative of the formula (II):

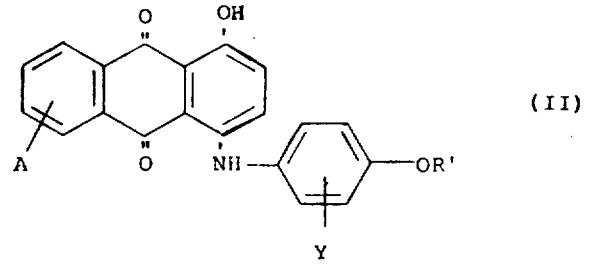

with an imide of the formula (III):

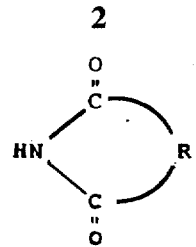

and formaldehyde or a formaldehyde generating substance in the presence of an acid. In formulae II and III, the symbols A, Y, R and R' have the same meanings as in formula I.

Among the suitable 1-hydroxy-4-(4'-alkoxyanilino)-anthraquinone derivatives of formula II are 1-hydroxy-4-(p-anisidino)-anthraquinone; 1-hydroxy-4-(2'-chloro-4'-methoxyanilino)-anthraquinone; 1-hydroxy-4-(p-anisidino)-6-chloroanthraquinone; 1-hydroxy-4-(p-anisidino)-7-bromo-anthraquinone; 1-hydroxy-4-(p-anisidino)-6-methyl-anthraquinone; 1-hydroxy-4-(2'-ethyl-4'-ethoxyanilino)-6-chloro-anthraquinone; 1-hydroxy-4-(4'-n-propoxyanilino)-anthraquinone.

Among the suitable imides of formula III are maleimide, succinimide, glutarimide, adipimide, phthalimide, cyclohexaneimide, cyclohex-4-eneimide and 1,8-naphthalimide. In addition, substituted imides such as 2-methylsuccinimide, 2,3-dimethylsuccinimide, 2-bromosuccinimide, 3-methylglutarimide, 2-chloroglutarimide, 2-methylcyclohexaneimide, 2,3-dichlorocyclohexaneimide and 2-bromocyclohexaneimide, are also useful.

Either formaldehyde or a formaldehyde generating substance, such as paraformaldehyde, can be employed with equal facility in the reaction.

The reaction is performed in a non-oxidizing, strongly-acid medium. Among the acids which can be used are phosphoric acid, sulfuric acid, glacial acetic acid, and halo acetic acids such as trifluoro acetic acid and trichloro acetic acid. Sulfuric acid is preferred.

According to the preferred manner of preparing the compounds of the present invention, the imide and the formaldehyde or formaldehyde generating substance are dissolved in the acid. Then, the anthraquinone derivative according to formula I is gradually added. The reaction mixture is maintained at a temperature within the range of about 10°–50°C, preferably 20°–30°C, and stirred or otherwise agitated until completion in from about ½ to 1 hour.

Among the new compounds of formula I, those in which A is hydrogen or chlorine, R' is lower alkyl with at most 2 carbon atoms, Y is hydrogen or chlorine, and R is unsubstituted, are preferred.

The following examples are presented to illustrate, but not limit the scope of the present invention. Unless otherwise indicated, all parts and percentages are by weight.

EXAMPLE I

To a mixture of 1.3 g. of paraformaldehyde and 4.3 g. succinimide dissolved in 100 ml of 96% sulfuric acid, is added at 30°C in portions 11.5 g. of 1-hydroxy-4-(p-phenetidino)-6-chloro-anthraquinone. The mixture is then stirred at 30°C for 1 hour and drowned in 1 l. of ice water. The precipitate is collected by filtration, washed with water until neutral and dried to give 16 g. of product with the following structure:

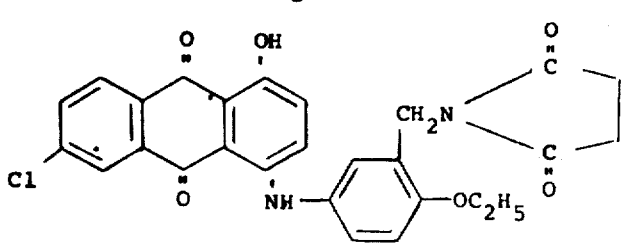

The product, as a disperse paste, is used to dye Dacron polyester fabric in bright reddish blue shade with good fastness properties.

EXAMPLE II

To a mixture of 1.3 g. of paraformaldehyde and 8 g. of 1,8-naphthalimide dissolved in 150 ml of 96% sulfuric acid at 30°C, is added 11 g. of 1-hydroxy-4-[4'-methoxy-2'-chloro-(anilino)]-anthraquinone. The mixture is stirred at 30°C for 1 hour and drowned in 1 l. of ice water. The precipitate is collected by filtration, washed with water until neutral and dried to give 17 g. of product with the following structure:

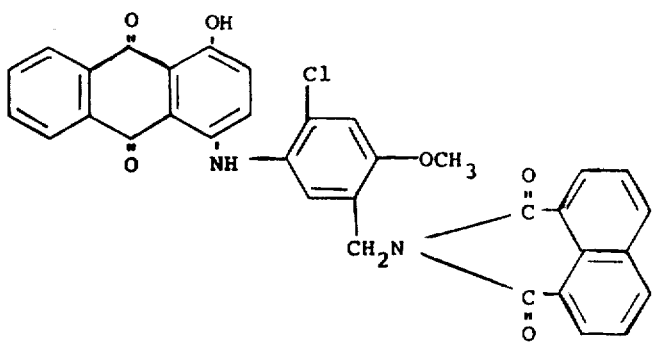

The product, as a disperse paste, is used to dye Dacron in reddish blue shade with good fastness properties.

EXAMPLE III

To a mixture of 1.3 g. of paraformaldehyde and 4.3 g. of maleimide dissolved in 100 ml of 96% sulfuric acid at 30°C, is added in portions 10.5 g. of 1-hydroxy-4-(p-anisidino)-anthraquinone. The mixture is stirred at 30°C for 1 hour and drowned to 1 l. of ice water. The precipitate is collected by filtration and washed with water until neutral to give the product of the following formula in good yield:

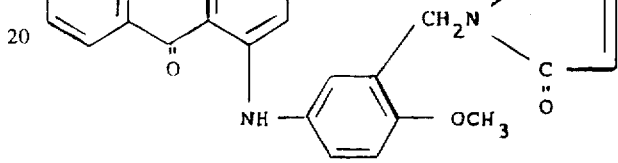

The product, as a disperse paste, is used to dye Dacron polyester fabric in bright reddish blue shade with good fastness properties.

EXAMPLE IV

To a mixture of 1.3 g. of paraformaldehyde and 6 g. of cyclohexane imide dissolved in 150 ml of 96% sulfuric acid at 30°C. is added 11 g. of 1-hydroxy-4-(p-anisidino)-anthraquinone. The mixture is stirred at 30°C. for 1 hour and drowned to 1 l. of ice water. The precipitate is collected by filtration, washed with water until neutral and dried to give a product with the following structure:

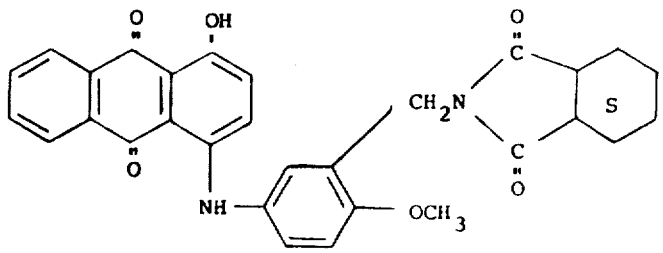

The dye, as a disperse paste, is used to dye polyester fiber in a reddish blue shade with good fastness properties.

EXAMPLE V

To a mixture of 1.3 g. paraformaldehyde and 5.9 g. phthalimide dissolved in 200 ml. 93% sulfuric acid at 25°C. is added 11.0 g. 1-hydroxy-4-(p-anisidino)-anthraquinone. The mixture is stirred at 30°C. for 3 hours and drowned into 2 l. ice water. The product is filtered, washed with water until neutral and dried. It has the formula:

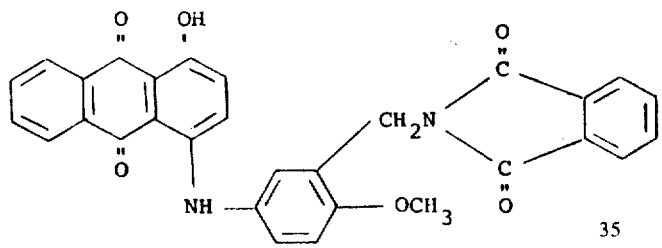

The product, as a disperse paste, is used to dye polyester fabric in bright reddish blue shades having good fastness to light and sublimation.

EXAMPLE VI

A dispersion is prepared by admixing the dyestuff of Example I with an equal amount of Marasperse CB (partially desulfonated sodium lignosulfonate, American Can Co.), 25 g. Sorbo (d-glucitol 70% soln.), 1.25 g. Preventol GDC (2,2'-methylenebis [4-chlorophenol], sodium salt), and water, and milling to produce a well dispersed dyestuff.

About 2 oz. of the dispersed dyestuff is dispersed in 83 cc. warm water and poured into a solution containing 0.2 g. Keltex gum (an alginic thickening agent) and 1 cc. Nekal NF (sodium alkylnaphthalenesulfonate, GAF Corp.) This solution is made up to a gallon with water.

Dacron polyester material is padded with the above at 160°F., dried and cured at 425°F. for 90 seconds. The material is soaped at the boil for 5 minutes, washed and dried. A bright reddish blue dyeing is obtained which has good fastness properties.

Other modifications of this invention will be apparent to those skilled in the art from the foregoing description, and these are intended to be included within the scope of this invention, which is limited only by the appended claims.

What is claimed is:

1. A compound of the formula

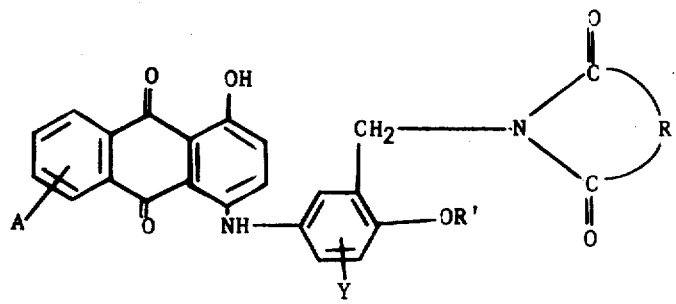

in which A is selected from the group consisting of hydrogen, chlorine, bromine, and lower alkyl; R represents a member selected from the group consisting of alkylene of from 2 to 4 carbon atoms, vinylene, 1,2-benzene, 1,2-cyclohexane, 1,8-naphthalene, and 1,2-cyclohex-4-ene; R' is lower alkyl; and Y is selected from the group consisting of hydrogen, hydroxy, chlorine, bromine, lower alkyl, and lower alkoxy.

2. A compound according to claim 1 in which A is selected from the group consisting of hydrogen and chlorine, R' is alkyl having 1 or 2 carbon atoms, and Y is selected from the group consisting of hydrogen and chlorine.

3. The compound according to claim 2 which is 1-hydroxy-4-[3'-(methyl-N-succinimido)-4'-ethoxy]-6-chloroanthraquinone.

4. The compound according to claim 2 which is 1-hydroxy-4-[2'-chloro-3'-(methyl-N-1,8-naphthalimido)-4'-methoxy]-anthraquinone.

5. The compound according to claim 2 which is 1-hydroxy-4-[3'-(methyl-N-maleimido)-4'-ethoxy]-anthraquinone.

6. The compound according to claim 2 which is 1-hydroxy-4-[3'-(methyl-N-cyclohexaneimido)-4'-methoxy]-anthraquinone.

7. The compound according to claim 2 which is 1-hydroxy-4-[3'-(methyl-N-phthalimido)-4'-methoxy]-anthraquinone.

* * * * *